US009460232B2

United States Patent
Li et al.

(10) Patent No.: US 9,460,232 B2
(45) Date of Patent: Oct. 4, 2016

(54) SEARCHING DOCUMENT OBJECT MODEL ELEMENTS BY ATTRIBUTE ORDER PRIORITY

(75) Inventors: Fangsheng Li, Shanghai (CN); Weiqi Lu, Shanghai (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 527 days.

(21) Appl. No.: 12/755,628

(22) Filed: Apr. 7, 2010

(65) Prior Publication Data
US 2011/0252040 A1 Oct. 13, 2011

(51) Int. Cl.
*G06F 7/00* (2006.01)
*G06F 17/30* (2006.01)

(52) U.S. Cl.
CPC ... *G06F 17/30911* (2013.01); *G06F 17/30643* (2013.01); *G06F 17/30663* (2013.01); *G06F 17/30864* (2013.01)

(58) Field of Classification Search
CPC .................. G06F 17/30643; G06F 17/30663; G06F 17/30864
USPC .................................. 707/708, 713, 748, 765
See application file for complete search history.

(56) References Cited

U.S. PATENT DOCUMENTS

| | | | | |
|---|---|---|---|---|
| 6,327,574 B1 * | 12/2001 | Kramer et al. | ............ | 705/14.66 |
| 6,910,029 B1 * | 6/2005 | Sundaresan | | |
| 7,251,777 B1 * | 7/2007 | Valtchev et al. | ............... | 715/234 |
| 8,001,117 B2 * | 8/2011 | Yahia et al. | ................... | 707/728 |
| 8,005,863 B2 * | 8/2011 | de la Iglesia et al. | ........ | 707/791 |
| 8,046,358 B2 * | 10/2011 | Thattil | ............ | 707/736 |
| 8,122,016 B1 * | 2/2012 | Lamba et al. | ................. | 707/723 |
| 2003/0078900 A1 * | 4/2003 | Dool | ............................... | 706/18 |
| 2003/0154189 A1 * | 8/2003 | Egilsson et al. | ................... | 707/1 |
| 2005/0002364 A1 * | 1/2005 | Ozer et al. | .................... | 370/338 |
| 2005/0198060 A1 * | 9/2005 | Imaki et al. | ................... | 707/102 |
| 2006/0053410 A1 * | 3/2006 | Charisius et al. | ............ | 717/109 |
| 2006/0112073 A1 * | 5/2006 | Jensen et al. | ..................... | 707/2 |
| 2006/0155725 A1 * | 7/2006 | Foster et al. | .................. | 707/100 |
| 2006/0288275 A1 * | 12/2006 | Chidlovskii et al. | ......... | 715/513 |
| 2007/0094060 A1 * | 4/2007 | Apps et al. | ....................... | 705/7 |
| 2007/0169008 A1 * | 7/2007 | Varanasi et al. | .............. | 717/136 |
| 2008/0189269 A1 * | 8/2008 | Olsen | ................. | 707/5 |
| 2009/0019036 A1 * | 1/2009 | Roy et al. | .......................... | 707/5 |
| 2009/0110300 A1 * | 4/2009 | Kihara et al. | ................. | 382/224 |
| 2009/0150412 A1 * | 6/2009 | Idicula et al. | ................ | 707/100 |
| 2009/0172700 A1 * | 7/2009 | Perzy et al. | .................. | 719/318 |
| 2009/0254549 A1 * | 10/2009 | Epstein | ............................ | 707/5 |
| 2010/0121853 A1 * | 5/2010 | Iglesia et al. | ................. | 707/737 |

(Continued)

*Primary Examiner* — Mark E Hershley
(74) *Attorney, Agent, or Firm* — Kilpatrick Townsend & Stockton LLP

(57) ABSTRACT

Embodiments of the invention provide systems and methods for searching for elements of a document based on an order priority of attributes of a query expression. According to one embodiment, a method of searching a plurality of objects of a document, such as elements of a DOM document, can comprise generating a query expression with attributes related to a target object of the document. For example, the expression can comprise an XPath expression. The attributes of the query expression can be parsed into one or more attribute groups, each comprising at least one attribute, based on logical operators between the attributes. Each one or more attribute groups of each expression can be weighted and a search can be performed for the target object in the document based on the weighted one or more attribute groups of the query expression.

11 Claims, 6 Drawing Sheets

(56) References Cited

U.S. PATENT DOCUMENTS

| | | |
|---|---|---|
| 2010/0153395 A1* | 6/2010 | Hannuksela et al. ......... 707/737 |
| 2010/0195909 A1* | 8/2010 | Wasson et al. ............... 382/176 |
| 2010/0281177 A1* | 11/2010 | Devillers ..................... 709/231 |
| 2010/0299327 A1* | 11/2010 | Kiefer et al. ................. 707/736 |
| 2011/0055777 A1* | 3/2011 | Tremaine et al. ............ 716/106 |
| 2011/0153630 A1* | 6/2011 | Vernon et al. ................ 707/758 |

* cited by examiner

SEARCHING DOCUMENT OBJECT MODEL ELEMENTS BY ATTRIBUTE ORDER PRIORITY

BACKGROUND OF THE INVENTION

Embodiments of the present invention relate generally to methods and systems for searching for elements of a document and more particularly to searching for elements of a document based on an order priority of attributes of a query expression.

The Document Object Model (DOM) is a well-known convention for representing and interacting with documents such as HyperText Markup Language (HTML) and eXtensible Markup Language (XML) documents. The DOM provides conventions for addressing and manipulating "elements," e.g., buttons, links, etc., and other objects within the document independent of platforms or languages.

The XML Path Language (XPath), is a query language for selecting nodes from an XML document. As such, XPath provides a way to search for an element in a DOM tree. For example, since HTML pages can be implemented as a DOM document, it is natural to assume that XPath is a good tool for finding objects inside such an HTML page.

However, XPath does not provide many, if any, operators to help find objects in a DOM document where the attributes might change. Furthermore, test tools that may utilize XPath expressions to search a DOM document use a waterfall or "fallback attribute" approach to finding elements in the document. With a waterfall approach, if an element cannot be found by one or more attributes, additional attributes are tried instead. However, once an attribute is matched, that object is considered to be a match for the XPath expression, even if additional or other attributes do not match. As a result, objects with similar attributes are often mistaken for each other and misidentified by such searches. Hence, there is a need for improved methods and systems for searching for elements of a document.

BRIEF SUMMARY OF THE INVENTION

Embodiments of the invention provide systems and methods for searching for elements of a document based on an order priority of attributes of a query expression. According to one embodiment, a method of searching elements of a document, such as a DOM document, can comprise generating a query expression for searching the document. For example, the query expression can comprise an XPath expression. The query expression can comprise one or more attributes related to attributes of a target object of the document, i.e., attributes of an element of the document for which the search is being performed. The attributes of the query expression can be parsed into one or more attribute groups, each comprising at least one attribute, based on logical operators between the attributes. For example, parsing attributes of the query expression into one or more attribute groups can comprise generating a tree structure representing the attributes and logical operators of the expression. Each one or more attribute groups of the parsed query expression can be weighted based on an order priority of the attributes and a search can be performed for the target object in the document based on the weighted one or more attribute groups of the query expression.

Searching for the target object in the document based on the weighted one or more attribute groups of the parsed query expression can comprise comparing each object of the document to the parsed query expression. Each object can then be scored based on the weight of each attribute group matching attributes of that object. The target object can be selected based on the scoring of each object. That is, a match for the query expression can be determined based on the scoring of the objects, e.g., selecting an object with a highest score.

Weighting each one or more attribute group can comprise identifying leaf nodes of the tree structure, each leaf node representing an attribute group. Each leaf node can be weighted. For example, weighting each leaf node can comprise assigning a weight exponentially based on an index of the leaf within the expression. A parent node for each leaf node can be identified and the parent node can be weighted. For example, weighting the parent node can comprise summing a weight of each child node of the parent node. A determination can be made as to whether an expression represented by the parent node evaluates as false. In response to determining the expression represented by the parent node evaluates as false, each node of a sub-tree represented by the parent node and child leaf nodes of the parent can be scored as zero.

According to another embodiment, a system can comprise a processor and a memory communicatively coupled with and readable by the processor. The memory can have stored therein a set of instructions which, when executed by the processor, cause the processor to search elements of a Document Object Model (DOM) document by generating an XPath expression for searching the DOM document, the XPath expression comprising one or more attributes related to a target element of the DOM document, parsing the attributes of the XPath expression into one or more attribute groups based on logical operators between the attributes, each attribute group comprising at least one attribute, weighting each one or more attribute groups of the XPath expression, and searching for the target element in the DOM document based on the weighted one or more attribute groups of the XPath expression. Searching for the target element in the DOM document based on the weighted one or more attribute groups of the XPath expression can comprise comparing each element of the document to the parsed XPath expression, scoring each element based on the weight of each attribute group matching attributes of that element, and selecting an element based on the scoring of each element.

Parsing attributes of the XPath expression into one or more attribute groups can comprise generating a tree structure representing the attributes and logical operators of the XPath expression. In such cases, weighting each one or more attribute group can comprise identifying leaf nodes of the tree structure, each leaf node representing an attribute group, and weighting each leaf node. Weighting each leaf node can comprise assigning a weight exponentially based on an index of the leaf within the expression. A parent node for each leaf node can be identified and weighted, for example, by summing a weight of each child node of the parent node. A determination can be made as to whether an expression represented by the parent node evaluates as false. In response to determining the expression represented by the parent node evaluates as false, each node of a sub-tree represented by the parent node and child leaf nodes of the parent can be scored as zero.

According to yet another embodiment, a machine readable medium can have stored therein a series of instructions which, when executed by a processor, cause the processor to search elements of a Document Object Model (DOM) document by receiving an XPath expression for searching the document, the XPath expression comprising one or more attributes related to a target element of the DOM document, parsing the attributes of the XPath expression into one or more attribute groups based on logical operators between the attributes, each attribute group comprising at least one attribute, weighting each one or more attribute groups of the parsed XPath expression based on an order priority of the attributes, and searching for the target element in the DOM document based on the weighted one or more attribute groups of the parsed XPath expression. Searching for the target element in the DOM document based on the weighted one or more attribute groups of the parsed XPath expression can comprise comparing each element of the DOM document to the parsed and weighted XPath expression, scoring each element based on the weight of each attribute group matching attributes of that element, and selecting the target element based on the scoring of each element.

Parsing attributes of the XPath expression into one or more attribute groups can comprise generating a tree structure representing the attributes and logical operators of the XPath expression. In such cases, weighting each one or more attribute group can comprise identifying leaf nodes of the tree structure, each leaf node representing an attribute group, weighting each leaf node, wherein weighting each leaf node comprises assigning a weight exponentially based on an index of the leaf within the expression, identifying a parent node for each leaf node, weighting the parent node, wherein weighting the parent node comprises summing a weight of each child node of the parent node, determining whether an expression represented by the parent node evaluates as false, and in response to determining the expression represented by the parent node evaluates as false, scoring each node of a sub-tree represented by the parent node and child leaf nodes of the parent as zero.

DETAILED DESCRIPTION OF THE INVENTION

Figure 1:
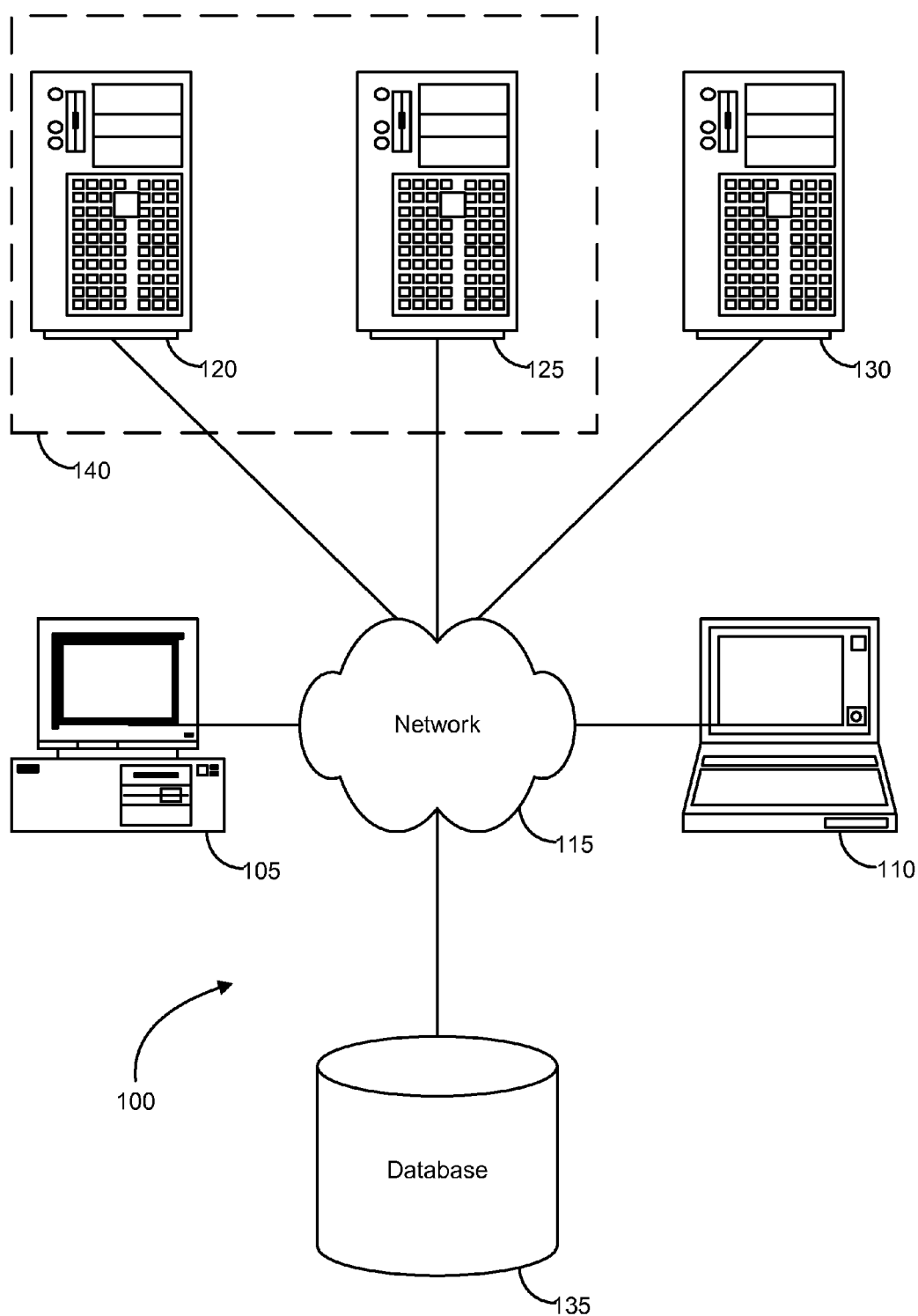
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for searching for elements of a document based on an order priority of attributes of a query expression for searching the document. For example, a Document Object Model (DOM) document can be searched based on an XPath query expression for elements of the document matching or nearly matching the expression. The XPath expressions can have a number of attributes representing or relating to attributes of the elements of the document and joined by any number of logical operators, e.g., logical AND, OR, NOT, etc. The attributes of the XPath expression can be parsed based on the presence/location of these operators and grouped into subgroups of attributes which can be represented in a logical tree structure. The groups and subgroups, i.e., nodes and leaves of the tree, can be weighted based on a weighting algorithm or set of weighting rules as will be described herein. The effect of these rules generally can be seen as weighting the subgroups or nodes and leaves based on an order priority of the attributes as they appear in the expression. A match can then be found for the expression by comparing the parsed and weighted expression, e.g., the tree structure against the elements or objects of the document. In this comparison, each element or object can be scored based on the attributes that match between the expression and the element/object. That element with the highest score can then be considered the match or best match with the query expression.

Stated another way, searching a plurality of objects of a document, such as elements of a DOM document, can comprise generating or receiving a query expression with attributes related to a target object of the document. For example, the expression can comprise an XPath expression and the document can comprise a DOM document. The attributes of the query expression can be parsed into one or more attribute groups, each comprising at least one attribute, based on logical operators between the attributes. Each one or more attribute groups of each expression can be weighted and a search can be performed for the target object in the document based on the weighted one or more attribute groups of the query expression. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
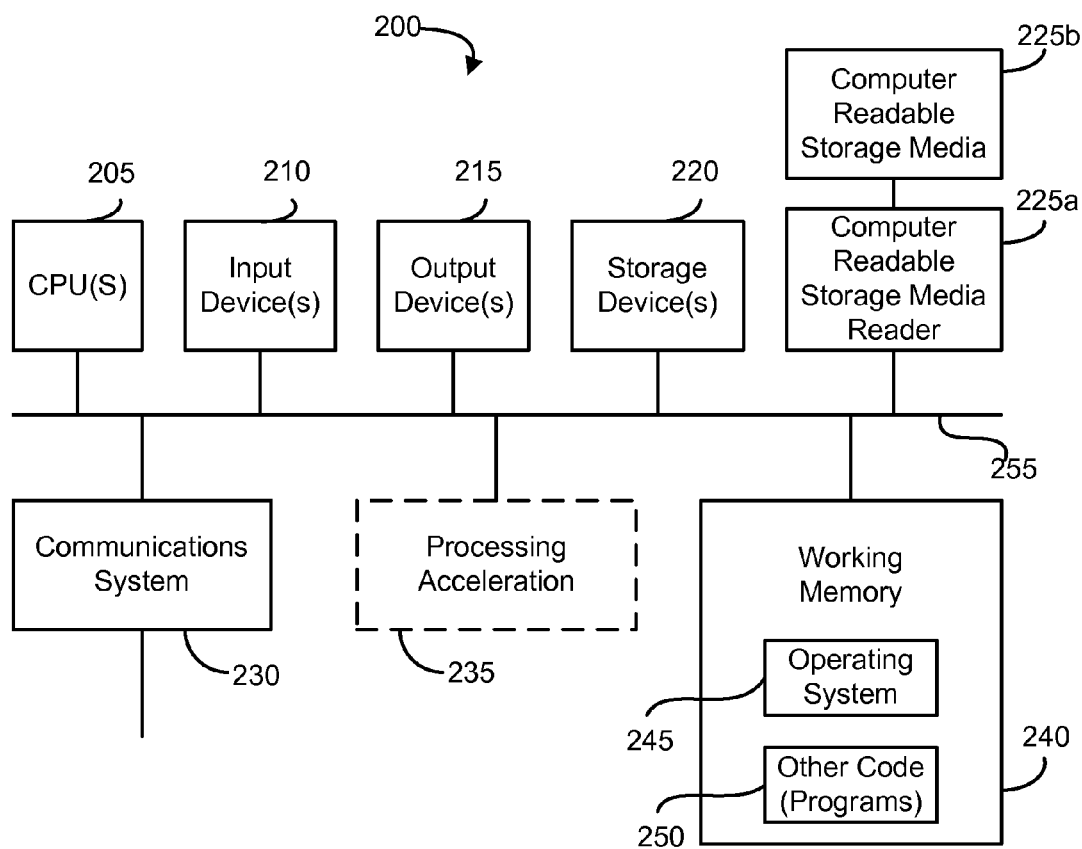
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
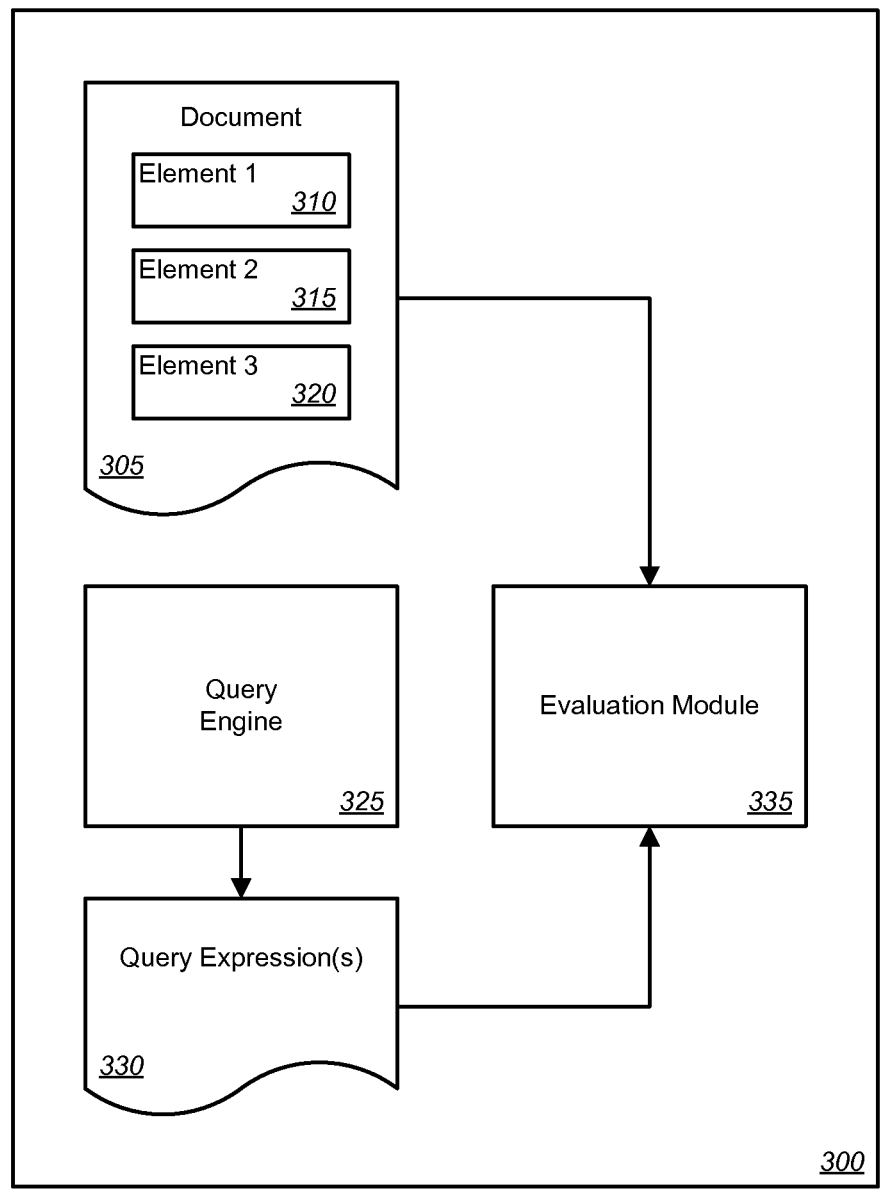
FIG. 3 is a block diagram illustrating, at a high-level, functional components of a system for searching a DOM document according to one embodiment of the present invention.

FIG. 3 is a block diagram illustrating, at a high-level, functional components of a system for searching a DOM document according to one embodiment of the present invention. In this example, the system 300 includes an operating environment 300 such as a test environment executing on one or more computer systems such as described in detail above. The environment 300 can include one or more documents 305 such as, but not limited to, DOM documents. The documents 305 can each include one or more objects, for example in the case of a DOM document, one or more elements 310-320. For example, the document may comprise a web page or an XML document. The web page may include a number of elements such as buttons, other controls, links, etc, i.e., the objects.

The environment 300 can also include a query engine 325 such as, for example, an XPath engine. The query engine 325 can be adapted to generate or receive one or more query expressions 330, including but not limited to one or more XPath expressions, for searching the one or more documents 305 for particular elements. That is, the query engine can receive a query, for example, user via a user interface (not shown here) or may retrieve a previously stored query from memory (not shown here). In other cases, the query engine may receive or generate a query from or based on a request and/or input from an application or other module (not shown here). In any event, the query expression 330 can comprise a number of attributes that correspond to attributes of an element 310 of the document 305 for which the search is being conducted, i.e., the target element.

The environment 300 can also include an evaluation module 335 adapted to search for elements 310-320 of the documents 305 based on an order priority of attributes of a query expression 330 for searching the document as will be described in detail below with reference to FIG. 4. Generally speaking, the query expressions 330 can have a number of attributes representing or relating to attributes of the elements 310-320 of the document 305 and joined by any number of logical operators, e.g., logical AND, OR, NOT, etc. The attributes of the query expression 330 can be parsed based on the presence/location of these operators and grouped into subgroups of attributes which can be represented in a logical tree structure. The groups and subgroups, i.e., nodes and leaves of the tree, can be weighted based on a weighting algorithm or set of weighting rules as will be described in greater detail below with reference to FIG. 5. The effect of these rules generally can be seen as weighting the subgroups or nodes and leaves based on an order priority of the attributes as they appear in the expression. A match can then be found for the query expression 33 by comparing the parsed and weighted expression, e.g., the tree structure against the elements 310-320 or objects of the document 305. In this comparison, each element 310-320 or object can be scored based on the attributes that match between the query expression 330 and the element/object 310-320. That element with the highest score can then be considered the match or best match with the query expression.

Figure 4:
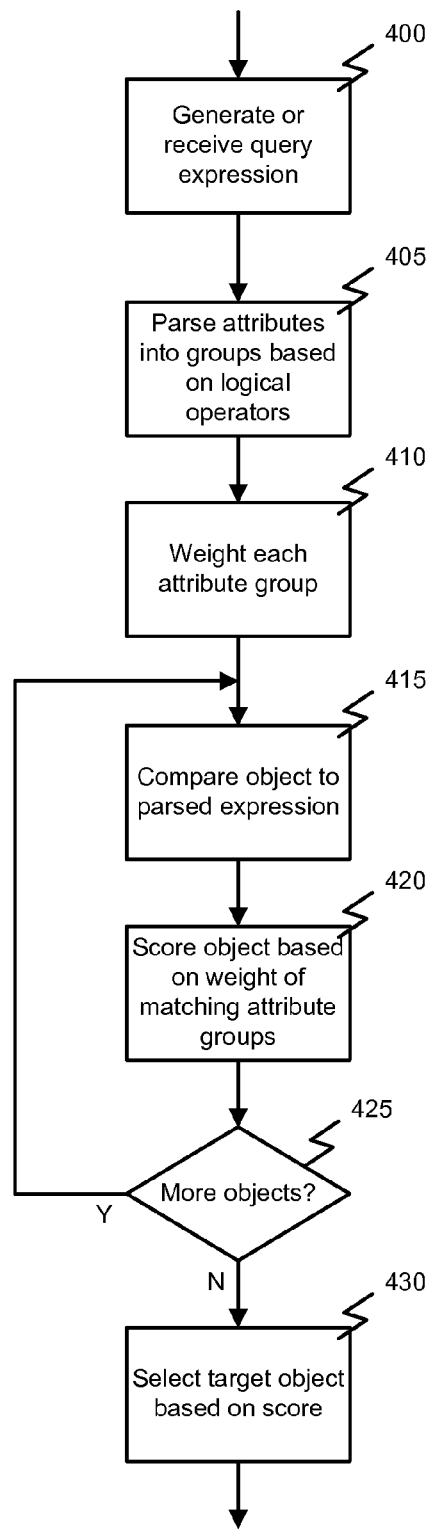
FIG. 4 is a flowchart illustrating a process for searching a DOM document according to one embodiment of the present invention.

FIG. 4 is a flowchart illustrating a process for searching a DOM document according to one embodiment of the present invention. In this example, processing begins with generating 400 or receiving a query expression for searching the document. The query expression can comprise one or more attributes related to attributes of a target object of the document, i.e., the object for which the search is being performed. For example, the expression can comprise an XPath expression. The attributes of the query expression can be parsed 405 into one or more attribute groups, each comprising at least one attribute, based on logical operators between the attributes. For example, parsing 405 attributes of the query expression into one or more attribute groups can comprise generating a tree structure representing the attributes and logical operators of the expression. Each one or more attribute groups of the parsed query expression can be weighted 410 based on an order priority of the attributes within the expression. An exemplary weighting process will be described in greater detail below with reference to FIG. 5.

Once the query expression has been parsed 405 and weighted 410, a search can be performed for the target object based on the weighted attribute groups of the parsed expression. Searching for the target object in the document based on the weighted one or more attribute groups of the query expression can comprise comparing 420 the each object to the parsed and weighted query expression. Each object can then be scored 425 based on the weight of each attribute group matching attributes of that object. A determination 425 can be made as to whether additional objects remain to be searched. In response to determining 425 more objects remain, processing can continue with comparing 415 and scoring 420 objects until all objects of the document have been searched. Once all objects have been searched, an object, i.e., the target object, can be selected 430 based on the scoring of each object of the document. That is, a match can be determined based on the scoring of the objects, e.g., selecting an object with a highest score from matching weighted attributes of the parsed query expression.

Figure 5:
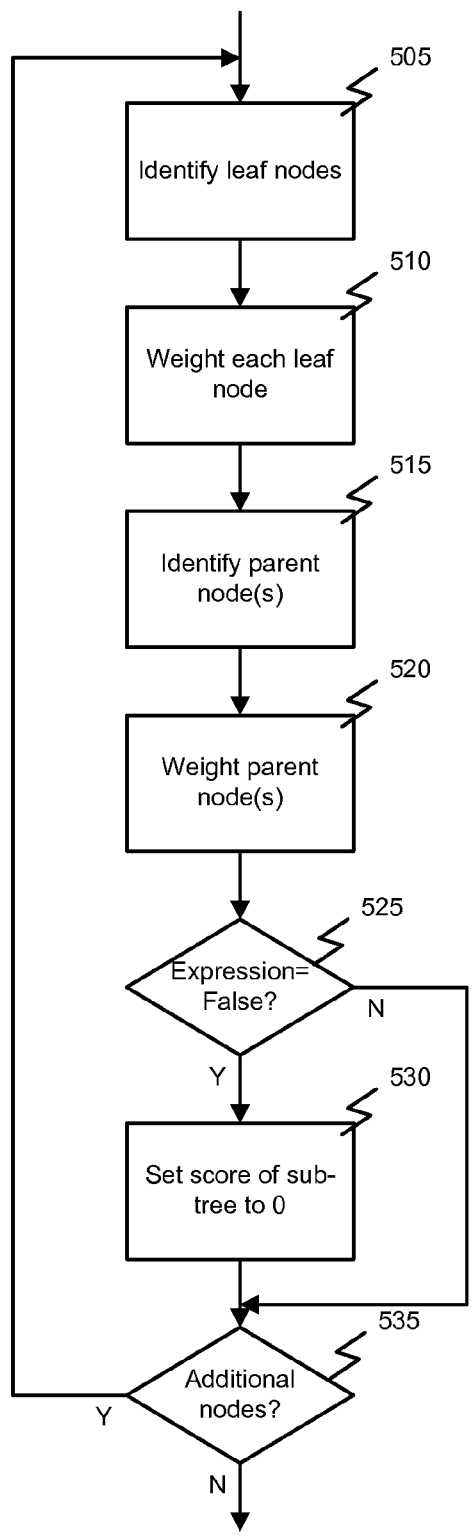
FIG. 5 is a flowchart illustrating additional details of an attribute weighting process according to one embodiment of the present invention.

FIG. 5 is a flowchart illustrating additional details of an attribute weighting process according to one embodiment of the present invention. In this example, processing can begin with identifying 505 leaf nodes of the tree structure. As noted above, each leaf node can represent an attribute group. Each leaf node can be weighted 510. For example, weighting 510 each leaf node can comprise assigning a weight exponentially based on an index of the leaf within the expression. In other words, the weight of each leaf node can be 2 raised to the power N where N is the index of the leaf attribute within the whole expression. A parent node for each leaf node can be identified 515 and the parent node can be weighted 520. For example, weighting 520 the parent node can comprise summing a weight of each child node of the parent node. In other words, the weight of a parent node is the sum of its child nodes' weights. A determination 525 can be made as to whether an expression represented by the parent node evaluates as false. In response to determining 525 the expression represented by the parent node evaluates as false, each node of a sub-tree represented by the parent node and child leaf nodes of the parent can be scored 530 as zero. In other words, If the expression that represents the sub-tree under one node is "False," the whole sub-tree's score can be cleared to zero. A determination 535 can be made as to whether additional nodes remain to be weighted. In response to determining 535 that additional nodes remain, processing can return to identify 505 and weight 510 leaf nodes, identify 515 and weight 520 parents of those leafs, and down-weight false expressions 525 and 530 until all nodes of the current tree or expression have been processed.

Figure 6A:
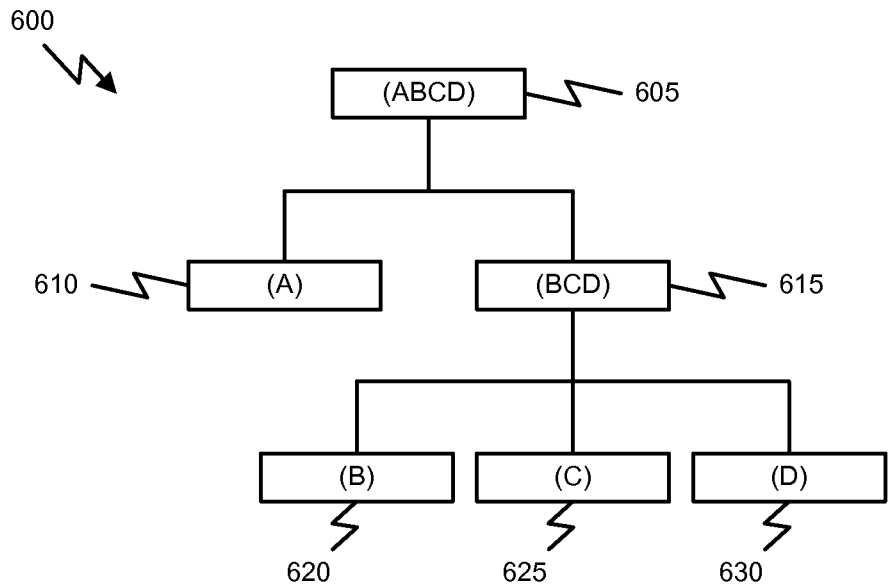
FIGS. 6A and 6B illustrate an exemplary tree structure representing a parsed and weighted query expression according to one embodiment of the present invention.
Figure 6B:
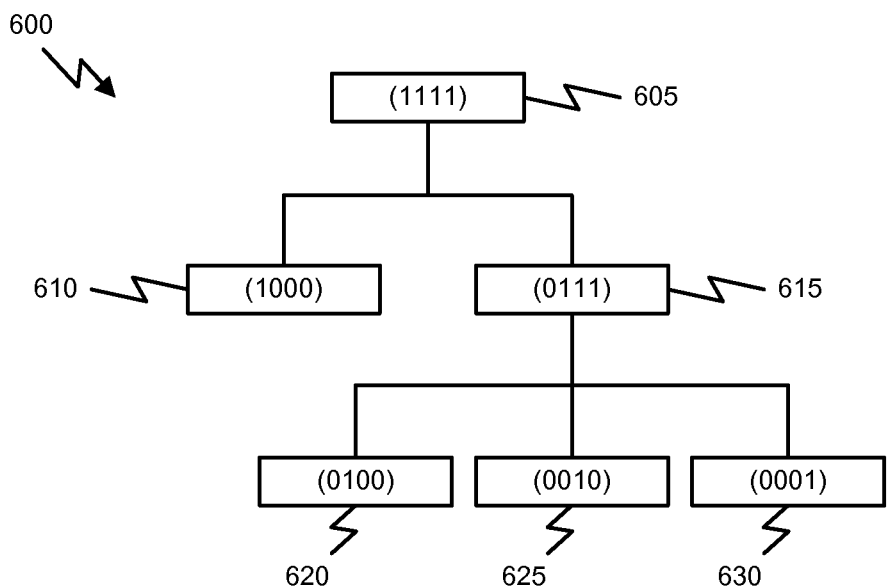

To further illustrate these processes, the following examples are provided. As noted above, a query expression can be received or generated that can be used to search one or more documents. An exemplary query expression can be an XPath expression such as:

path="/web:a[@a='w' and (@b='x' or @c='y' or @d='z')]";

Also as noted above, this expression can be parsed, i.e., represented as a logical tree structure, based on the presence and/or location of the logical operators (and, or, not, etc.) within the expression. Such a parsing can result in a tree structure such as represented in FIG. 6A. As shown here, the expression can be parsed into and represent as a tree 600 having a number of nodes 605-615 and leaves 620-630. The nodes 605-615 and leaves 620-630 can be weighted as described above with reference to FIG. 5. A result of such a weighting is illustrated in FIG. 6B.

Once parsed and weighted, the query expression can be used to search objects of the document. For example, the document may have objects with the attributes as follows:

TestObject A: a='w', b='x1', c='y1', d='z'
TestObject B: a='w', b='x1', c='y', d='z1'
TestObject C: a='w', b='x', c='y', d='z1'
TestObject D: a='w', b='x', c='y', d='z'

Each of these objects can be compared to the parsed and weighted query expression and can be scored based on the attributes that match between the object and the expression and the weight assigned to the matching attributes. Results of this scoring for the example here are illustrated in the following table:

| TestObject | Attr 1<br>a = w | Attr 2<br>b = x | Attr 2<br>c = y | Attr 4<br>d = z | Smart Mode Score |
|---|---|---|---|---|---|
| A | 1000 | 0000 | 0000 | 0001 | 8 + 1 = 9 |
| B | 1000 | 0000 | 0010 | 0000 | 8 + 2 = 10 |
| C | 1000 | 0100 | 0010 | 0000 | 8 + 4 + 2 = 14 |
| D | 1000 | 0100 | 0010 | 0001 | 8 + 4 + 2 + 1 = 15 (winner) |
| E | 0000 | 0100 | 0010 | 0001 | 0 (because root expression is false) |

As noted, the object with the highest score, in this example TestObject D, can be selected as the best match, i.e., the target object, for the parsed and weighted query expression.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for searching a plurality of objects within ea Document Object Model (DOM) document, the method comprising:

receiving an XPath expression, the XPath expression comprising a plurality of attributes and one or more logical operators defining relationships between the attributes, the logical operators comprising one or more of a logical AND, a logical OR, or a logical NOT;

generating a tree structure representing the XPath expression, the tree structure comprising a plurality of nodes arranged according to a hierarchical relationship between the attributes based upon positions of the plurality of attributes and the one or more logical operators in the XPath expression, each node in the plurality of nodes representing a group of one or more attributes from the plurality of attributes, the plurality of nodes including a set of leaf nodes that do not have any child nodes;

associating a weight value with each node in the plurality of nodes in the tree structure based upon a location of the node in the tree structure, wherein the associating comprises:
   assigning a weight value to each of the set of leaf nodes based upon the positions of the plurality of attributes corresponding to the set of leaf nodes in the XPath expression; and
   for each node in the plurality of nodes other than the set of leaf nodes, assigning a weight value to the node based upon weight values assigned to one or more child nodes of the node;
for each object in the plurality of objects within the DOM document, calculating a score for the object based on a comparison of one or more attributes of the object to the plurality of attributes within the XPath expression and based upon the weight values associated with the plurality of nodes in the tree structure;
determining a target object from the plurality of objects within the DOM document, based on the scores calculated for the plurality of objects; and
outputting information related to the target object as a response to the receipt of the XPath expression.

2. The method of claim 1, wherein assigning a weight value to each leaf node comprises assigning weight values exponentially based on indexes of each leaf node within the XPath expression.

3. The method of claim 2, wherein assigning weight values to nodes other than the set of leaf nodes comprises summing weight values of each child node of the node.

4. The method of claim 3, wherein assigning weight values to nodes other than the set of leaf nodes further comprises:
   determining whether an expression represented by the node evaluates as false; and
   in response to determining the expression represented by the node evaluates as false, scoring each child node of the node as zero.

5. The method of claim 4, wherein determining the target object comprises selecting an object from the plurality of objects with a highest score.

6. A machine-readable memory device comprising a set of instructions stored therein which, when executed by a processor, cause the processor to search elements within a Document Object Model (DOM) document by:
   receiving an XPath expression, the XPath expression comprising a plurality of attributes and one or more logical operators defining relationships between the attributes, the logical operators comprising one or more of a logical AND, a logical OR, or a logical NOT;
   generating a tree structure representing the XPath expression, the tree structure comprising a plurality of nodes arranged according to a hierarchical relationship between the attributes based upon positions of the plurality of attributes and the one or more logical operators in the XPath expression, each node in the plurality of nodes representing a group of one or more attributes from the plurality of attributes, the plurality of nodes including a set of leaf nodes that do not have any child nodes;
   associating a weight value with each node in the plurality of nodes in the tree structure based upon a location of the node in the tree structure, wherein the associating comprises:
      assigning a weight value to each of the set of leaf nodes based upon the positions of the plurality of attributes corresponding to the set of leaf nodes in the XPath expression;
      for each node in the plurality of nodes other than the set of leaf nodes, assigning a weight value to the node based upon weight values assigned to one or more child nodes of the node;
   for each object in the plurality of objects within the DOM document, calculating a score for the object based on a comparison of one or more attributes of the object to the plurality of attributes within the XPath expression and based upon the weight values associated with the plurality of nodes in the tree structure;
   determining a target object from the plurality of objects within the DOM document, based on the scores calculated for the plurality of objects; and
   outputting information related to the target object as a response to the receipt of the XPath expression.

7. The machine-readable memory device of claim 6, wherein assigning a weight value to each leaf node comprises assigning weight values exponentially based on indexes of each leaf node within the XPath expression.

8. The machine-readable memory device of claim 6, wherein assigning weight values to nodes other than the set of leaf nodes comprises:
   summing weight values of each child node of the node.

9. The machine-readable memory device of claim 8, wherein assigning weight values to nodes other than the set of leaf nodes further comprises:
   determining whether an expression represented by the node evaluates as false; and
   in response to determining the expression represented by the node evaluates as false, scoring each child node of the node as zero.

10. The machine-readable memory device of claim 9, wherein determining the target object comprises selecting an object from the plurality of objects with a highest score.

11. A system for searching a plurality of objects within a Document Object Model (DOM) document, the system comprising:
   a processor; and
   a memory communicatively coupled with and readable by the processor, the memory having stored therein a set of instructions which, when executed by the processor, cause the processor to:
      receive an XPath expression, the XPath expression comprising a plurality of attributes and one or more logical operators defining relationships between the attributes, the logical operators comprising one or more of a logical AND, a logical OR, or a logical NOT;
      parse the plurality of attributes of the XPath expression into a plurality of attribute groups using the placement of the logical operators between the attributes of the XPath expression;
      generate a tree structure representing the XPath expression, the tree structure comprising a plurality of nodes arranged according to a hierarchical relationship between the attributes based upon positions of the plurality of attributes and the one or more logical operators in the XPath expression, each node in the plurality of nodes representing a group of one or more attributes from the plurality of attributes, the plurality of nodes including a set of leaf nodes that do not have any child nodes;

associate a weight value with each node in the plurality of nodes in the tree structure based upon a location of the node in the tree structure, wherein the associating comprises:
  assigning a weight value to each of the set of leaf nodes based upon the positions of the plurality of attributes corresponding to the set of leaf nodes in the XPath expression, wherein assigning weight values to each particular leaf node comprises:
    determining the index of the particular leaf node within the XPath expression; and
    determining a weight value for the particular leaf node as exponentially based on the index of the particular leaf node within the XPath expression;
  for each node in the plurality of nodes other than the set of leaf nodes, assigning a weight value to the node based upon weight values assigned to one or more child nodes of the node, wherein assigning the weight values to each particular node other than a leaf node comprises:
    determining whether an expression represented by the particular node evaluates as false;
    in response to determining the expression represented by the particular node evaluates as false, scoring each child node of the node as zero;
    in response to determining the expression represented by the particular node does not evaluate as false, scoring each child node of the node as zero;
    summing weight values of each child node of the particular node;
    determining whether an expression represented by the particular node evaluates as false; and
for each object in the plurality of objects within the DOM document, calculating a score for the object based on a comparison of one or more attributes of the object to the plurality of attributes within the XPath expression and based upon the weight values associated with the plurality of nodes in the tree structure;
determining a target object from the plurality of objects within the DOM document, by selecting object in the plurality of objects having the highest calculated score; and
outputting information related to the target object as a response to the receipt of the XPath expression.

* * * * *

UNITED STATES PATENT AND TRADEMARK OFFICE
CERTIFICATE OF CORRECTION

PATENT NO. : 9,460,232 B2
APPLICATION NO. : 12/755628
DATED : October 4, 2016
INVENTOR(S) : Li et al.

It is certified that error appears in the above-identified patent and that said Letters Patent is hereby corrected as shown below:

In Column 9, Line 36, delete "If" and insert -- if --, therefor.

In Column 10, Line 49, in Claim 1, delete "within ea" and insert -- within a --, therefor.

Signed and Sealed this
Sixth Day of June, 2017

Michelle K. Lee
*Director of the United States Patent and Trademark Office*